(12) United States Patent
Andersson et al.

(10) Patent No.: US 11,378,027 B2
(45) Date of Patent: Jul. 5, 2022

(54) METHOD FOR CONTROLLING AN INTERNAL COMBUSTION ENGINE

(71) Applicant: VOLVO TRUCK CORPORATION, Gothenburg (SE)

(72) Inventors: Arne Andersson, Mölnlycke (SE); Staffan Lundgren, Hindås (SE); Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/254,044

(22) PCT Filed: Jun. 26, 2018

(86) PCT No.: PCT/EP2018/067128
§ 371 (c)(1),
(2) Date: Dec. 18, 2020

(87) PCT Pub. No.: WO2020/001755
PCT Pub. Date: Jan. 20, 2020

(65) Prior Publication Data
US 2021/0262403 A1    Aug. 26, 2021

(51) Int. Cl.
*F02D 41/00*    (2006.01)
*F02M 26/04*    (2016.01)
(Continued)

(52) U.S. Cl.
CPC ..... *F02D 41/0077* (2013.01); *F02D 41/0052* (2013.01); *F02D 41/0087* (2013.01);
(Continued)

(58) Field of Classification Search
CPC ............ F02D 41/0032; F02D 41/3005; F02D 41/008; F02D 41/0045; F02D 41/18;
(Continued)

(56) References Cited

U.S. PATENT DOCUMENTS

| 4,179,892 A * | 12/1979 | Heydrich | F02B 37/025 60/605.2 |
| 5,725,048 A * | 3/1998 | Burk | B60H 1/034 237/12.3 A |

(Continued)

FOREIGN PATENT DOCUMENTS

| DE | 102012015259 A1 | 2/2014 |
| EP | 2206899 A1 | 7/2010 |
| WO | 2016029207 A1 | 2/2016 |

OTHER PUBLICATIONS

International Search Report and Written Opinion dated Mar. 14, 2019 in corresponding International PCT Application No. PCT/EP2018/067128, 9 pages.
(Continued)

*Primary Examiner* — Phutthiwat Wongwian
*Assistant Examiner* — Sherman D Manley
(74) *Attorney, Agent, or Firm* — Venable LLP; Jeffri A. Kaminski (57) ABSTRACT

The invention provides a method for controlling an internal combustion engine (2) for controlling an internal combustion engine (2) comprising at least one first cylinder (201) and at least one second cylinder (202) with respective reciprocating pistons, an intake guide (305) arranged to guide air from a fresh air intake arrangement (303) to the first and second cylinders (201, 202), a fuel system (801, 802) arranged to inject fuel into the first and second cylinders (201, 202), a first exhaust guide (401) and a second exhaust guide (402) arranged to guide gases from the first and second cylinders (201, 202), respectively, towards an exhaust aftertreatment system (7), the method comprising—receiving (S1) in the first cylinder (201), from the intake guide (305), air from the fresh air intake arrangement (303) or gases including air from the fresh air intake arrangement
(Continued)

(303), —expelling from the first cylinder (201), to the first exhaust guide (401), gases in the form of the air received in the first cylinder, or in the form of exhaust gases from combustions in the first cylinder, including a portion of the air received in the first cylinder (201), —controlling (S4) a first exhaust valve (411) located in the first exhaust guide (401) so as to reduce or inhibit the transport of the gases from the first cylinder (201) to the exhaust after treatment system (7) and simultaneously recirculating the gases from the first exhaust guide (401) to the intake guide (305) by means of an exhaust gas recirculating (EGR) passage (404), —receiving in the second cylinder (202), from the intake guide (305), at least a portion of the gases recirculated from the first exhaust guide (401) to the intake guide (305), —injecting (S5) fuel into the second cylinder (202) so as to provide repetitive combustions with air in the received gases, —expelling from the second cylinder (202), to the second exhaust guide (402), the exhaust gases produced by the combustions in the second cylinder (202), and—controlling a second exhaust valve (412) located in the second exhaust guide (402) so as to guide the exhaust gases expelled from the second cylinder through the second exhaust guide (402) towards the exhaust after treatment system (7).

21 Claims, 6 Drawing Sheets (51) Int. Cl.
  *F02M 26/15* (2016.01)
  *F02M 26/23* (2016.01)
  *F02D 41/38* (2006.01)
(52) U.S. Cl.
  CPC ............. *F02D 41/38* (2013.01); *F02M 26/04* (2016.02); *F02M 26/15* (2016.02); *F02M 26/23* (2016.02)

(58) Field of Classification Search
  CPC .... F02D 41/0042; F02D 41/004; F02D 41/40; F02D 41/2467; F02D 2200/0402; F02D 2200/0406
  See application file for complete search history.

(56) References Cited

U.S. PATENT DOCUMENTS

| | | | | |
|---|---|---|---|---|
| 6,871,642 | B1* | 3/2005 | Osterwald | F02M 26/01 123/568.21 |
| 7,246,485 | B2* | 7/2007 | Ohki | F02D 41/029 60/285 |
| 7,454,897 | B2* | 11/2008 | Mizuguchi | F02M 26/24 60/285 |
| 8,534,050 | B2* | 9/2013 | Yanakiev | F02D 41/061 60/299 |
| 9,074,521 | B2* | 7/2015 | Russ | F02B 37/18 |
| 9,103,272 | B2* | 8/2015 | Buckland | F02D 41/0052 |
| 9,388,720 | B2* | 7/2016 | Kuenzel | F02D 41/0082 |
| 2008/0209889 | A1* | 9/2008 | Scheinert | F02B 37/025 60/303 |
| 2011/0067397 | A1* | 3/2011 | Hirth | F02B 37/025 60/602 |
| 2012/0078492 | A1* | 3/2012 | Freund | F02D 41/1497 701/108 |
| 2015/0040560 | A1* | 2/2015 | Jozsa | F02B 37/18 60/285 |
| 2016/0003134 | A1* | 1/2016 | Hodebourg | F02B 33/40 123/559.1 |
| 2016/0047341 | A1* | 2/2016 | Styles | F02M 26/52 123/568.18 |
| 2017/0152781 | A1* | 6/2017 | Free | F01N 9/00 |

OTHER PUBLICATIONS

International Preliminary Report on Patentability dated Oct. 8, 2020 in corresponding International PCT Application No. PCT/EP2018/067128, 19 pages.

* cited by examiner

METHOD FOR CONTROLLING AN INTERNAL COMBUSTION ENGINE

CROSS-REFERENCE TO RELATED APPLICATIONS

This application is a U.S. National Stage application of PCT/EP2018/067128, filed Jun. 26, 2018, and published on Jan. 2, 2020, as WO 2020/001755 A1, all of which is hereby incorporated by reference in its entirety.

TECHNICAL FIELD

The invention relates to a method for controlling an internal combustion engine. The invention also relates to a computer program, a computer readable medium, a control unit, an internal combustion engine, and a vehicle.

The invention can be applied in heavy-duty vehicles, such as trucks, buses and construction equipment, such as wheel loaders, haulers and excavators. Although the invention will be described with respect to a truck, the invention is not restricted to this particular vehicle, but may also be used in other vehicles such as buses, construction equipment and passenger cars. The invention may also be used on other transportation means such as ships and boats.

BACKGROUND

For a vehicle internal combustion engine, such as a diesel type engine for a heavy-duty vehicle, an exhaust after treatment system (EATS) is usually provided to reduce emissions, e.g. of nitrogen oxides (NOx). Such a system, which may include units such as a selective catalytic reduction (SCR) converter, requires exhaust gas temperatures that are relatively high in order to provide an efficient emission reduction.

However, measures to reduce fuel consumption may reduce the heat loss from the engine to the EATS. Therefore, particularly at low load operation, cold ambient temperatures, and/or cold start events, the EATS might not get enough heat to operate efficiently.

US2015040560A1 discloses, for increasing the temperature in an EATS when cold starting an engine, an exhaust gas recirculation (EGR) pipe which is branched off at an exhaust gas manifold part assigned to an inactive cylinder group. The EGR pipe forces air to an intake manifold part assigned to an active cylinder group. Each cylinder group comprises an intake throttle, which is adapted to be separately operable. The air intake upstream of the active intake manifold is throttled to increase the forced air flow. Although this may provide some improvement in cold start situations, there is still a need to further increase EATS temperatures at low load operations.

SUMMARY

An object of the invention is to reduce emissions from internal combustion engines. Another object of the invention is to improve the aftertreatment of exhaust gases from internal combustion engines at low load operations.

The objects are achieved by a method according to claim 1. Thus, the objects are achieved by a method for controlling an internal combustion engine comprising at least one first cylinder and at least one second cylinder with respective reciprocating pistons, an intake guide arranged to guide air from a fresh air intake arrangement to the first and second cylinders, a fuel system arranged to inject fuel into the first and second cylinders, a first exhaust guide and a second exhaust guide arranged to guide gases from the first and second cylinders, respectively, towards an exhaust after treatment system, the method comprising receiving in the first cylinder, from the intake guide, air from the fresh air intake arrangement, or gases including air from the fresh air intake arrangement, expelling from the first cylinder, to the first exhaust guide, gases in the form of the air received in the first cylinder, or in the form of exhaust gases from combustions in the first cylinder, including a portion of the air received in the first cylinder, controlling a first exhaust valve located in the first exhaust guide so as to reduce or inhibit the transport of the gases from the first cylinder to the exhaust after treatment system and simultaneously recirculating the gases from the first exhaust guide to the intake guide by means of an exhaust gas recirculating (EGR) passage, receiving in the second cylinder, from the intake guide, at least a portion of the gases recirculated from the first exhaust guide to the intake guide, injecting fuel into the second cylinder so as to provide repetitive combustions with air in the received gases, expelling from the second cylinder, to the second exhaust guide, exhaust gases produced by the combustions in the second cylinder, and controlling a second exhaust valve located in the second exhaust guide so as to guide at least a portion of the exhaust gases expelled from the second cylinder through the second exhaust guide, and to the exhaust after treatment system.

It should be noted that the engine may comprise more than one first cylinder. It should be noted that the engine may comprise more than one second cylinder.

Preferably, the method comprises receiving in the second cylinder, from the intake guide, a mix of air from the fresh air intake arrangement, and the gases recirculated from the first exhaust guide to the intake guide. It should be noted that since the gases from the first exhaust guide is recirculated to the intake guide, the method may also comprise receiving in the first cylinder, from the intake guide, a mix of air from the fresh air intake arrangement, and the gases recirculated from the first exhaust guide. In alternative embodiments, the method comprises receiving in the second cylinder, the gases recirculated from the first exhaust guide to the intake guide, but not air from the fresh air intake arrangement. This could be accomplished by the intake guide comprising a first and a second intake guide branch, each arranged to guide air from to a respective of the first and second cylinders, and by closing an intake valve in the second intake guide branch.

Embodiments of the invention provides an increased exhaust temperature by a reduction of the gas flow by blocking the outlet of the first exhaust guide with the first exhaust valve, routing the gases to an EGR passage, and mixing the rerouted gases with intake air. The increased exhaust temperature is accomplished by a reduction of the gas flow through the cylinders by letting two cylinders share the same gas flow in series, so as to provide only half gas flow through the engine.

Also, the second cylinder combustions per se may be controlled without consideration for keeping exhaust gas temperatures high. Therefore, the emission reduction may be provided without having to compromise running the engine for an optimal fuel efficiency.

The first exhaust valve may effectively provide for selectively guiding a portion or all of the gases from the first cylinder into the recirculation guide. Thereby the amount of gases introduced to the first cylinder and reaching an EATS, without passing the second cylinder, may be selectively controlled. Thereby the mass flow through the engine may be effectively controlled.

The invention is advantageously implemented in an engine where the fuel system is arranged to inject fuel into the first and second cylinders so as for combustions therein to be diesel type combustions. The invention may significantly improve exhaust after treatment processes of diesel engines at extended low load or idling operations, such as operations of asphalt laying vehicles, in queues or in city driving.

A turbine of a turbo charger may be located downstream of the first and second exhaust valves. At least one compressor may be provided upstream of the intake guide, and downstream of the fresh air intake arrangement. Preferably the turbo charger turbine is located downstream of the first and second exhaust valves. Such a location of the exhaust valves may secure that heat is not lost by expansion in the turbine before the gases reach the intake guide and the second cylinder.

Preferably, the method comprises controlling the first exhaust valve so as to inhibit the transport of the gases from the first cylinder to the exhaust after treatment system, and recirculating all gases from the first cylinder to the intake guide by means of the EGR passage. By closing the first exhaust valve, a significant increase of the temperature of gases reaching the EATS at low load operations, cold start events or low ambient temperatures may be provided. More specifically, guiding to the intake guide all gases expelled from the first cylinder means that no gases introduced to the first cylinder will reach the EATS, without passing the second cylinder. Thereby the mass flow through the engine may be substantially decreased, and a further significant increase of the temperature of gases reaching the EATS at low load operations, cold start events or low ambient temperatures may be provided. This will improve the after treatment of exhaust gases from the engine, e.g. at low load, and thereby engine emissions will be reduced.

In some embodiments, the method comprises controlling the fuel system so as to inhibit injection of fuel into the air or gases received in the first cylinder. Thereby, expelling gases from the first cylinder comprises expelling from the first cylinder the same amount of air as received in the first cylinder. The air may be heated by compression in the first cylinder.

Preferably, an EGR cooler is arranged to exchange heat with the gases guided in the EGR passage. Thereby, the EGR cooler may act as a heater for the gases recirculated from the first cylinders via the EGR passage.

Preferably, the EGR passage comprises a first EGR passage branch, extending from the first exhaust guide and being arranged to communicate with the intake guide, and a second EGR passage branch, extending from the second exhaust guide and being arranged to communicate with the intake guide, a first and a second EGR valve being arranged to control the flow through the first and second EGR passage branches, respectively, wherein recirculating the gases from the first exhaust guide to the intake guide comprises controlling the first EGR valve so as to be open. Thereby, recirculating the gases from the first exhaust guide to the intake guide may comprise controlling the second EGR valve to be closed. Alternatively, the method may comprise controlling, simultaneously to controlling the first EGR valve so as to be open, the second EGR valve to be at least partly open. Thereby, a reduced nitride oxide (NOx) production may be provide by a reduction of the oxygen concentration by routing a part combusted exhaust from the second cylinder through the EGR passage to be mixed with gas from the first cylinder before temperature conditioning in the EGR cooler. Thereby, the position of the second EGR valve may be controlled to control the flow of recirculated exhaust gases from the second cylinder.

Embodiments of the invention may comprise keeping the second exhaust valve open, simultaneously to controlling the first EGR valve so as to be open. Other embodiments of the invention may comprise partly closing the second exhaust valve, simultaneously to controlling the first EGR valve so as to be open. This may increase the pressure in the second exhaust guide in order to increase the pressure difference between the second exhaust guide and the intake guide.

In some embodiments, the method comprises controlling the fuel system to inject fuel into the first cylinder so as to provide repetitive combustions with the air or gases received in the first cylinder. This is beneficial at slightly higher loads. The amount of vibrations may be reduced by the combustions in the first cylinders. Also, since the gases from the first cylinder are mixed in the intake guide with fresh air and thereby cooled, a reduced production of nitride oxides (NOx) will be provided. The amount of fuel injected for each combustion in the first cylinder may be smaller than the amount of fuel injected for each combustion in the second cylinder. The method may advantageously comprise controlling a ratio of air in the gases expelled from the first cylinder and guided to the intake guide by controlling the amount of fuel injected into the first cylinder.

The objects are also achieved by an internal combustion engine comprising at least one first cylinder and at least one second cylinder with respective reciprocating pistons, an intake guide arranged to guide air from a fresh air intake arrangement to the first and second cylinders, a fuel system arranged to inject fuel into the first and second cylinders, a first exhaust guide and a second exhaust guide arranged to separately guide gases from the first and second cylinders, respectively, towards an exhaust after treatment system, a first exhaust valve located in the first exhaust guide so as to reduce or inhibit the transport of gases from the first cylinder to the exhaust after treatment system, a second exhaust valve located in the second exhaust guide, so as to reduce or inhibit the transport of gases from the second cylinder to the exhaust after treatment system, the first and second exhaust valves being individually controllable, a first EGR passage branch extending from the first exhaust guide and being arranged to communicate with the intake guide, a second EGR passage branch extending from the second exhaust guide and being arranged to communicate with the intake guide, a first and a second EGR valve being arranged to control the flow through the first and second EGR passage branches, respectively, wherein the first and second EGR valves are individually controllable.

Thereby, an engine adapted for embodiments of the method according to the invention is provided.

In some embodiments, the first and second EGR passage branches both communicate with the first and second cylinders via the intake guide.

In some embodiments of the engine, the intake guide comprises a first and a second intake guide branch, whereby each of the first and second cylinders is arranged to receive air from the fresh air intake arrangement separately via first and second intake guide branches, respectively, the first EGR passage branch extending to the first intake guide branch, and the second EGR passage branch extending to the second intake guide branch.

Such an engine allows further embodiments of the invention. For example, a method for controlling such an engine may comprise receiving in the first cylinder, from the first intake guide branch, air from the fresh air intake arrangement, controlling the fuel system so as to inhibit injection of fuel into the air received in the first cylinder, expelling from the first cylinder, to the first exhaust guide, the air received in the first cylinder, controlling the first exhaust valve so as to reduce or inhibit the transport of the air from the first cylinder to the exhaust after treatment system and simultaneously recirculating the air from the first exhaust guide to the first intake guide branch by means of the first EGR passage branch, receiving in the second cylinder, from the second intake guide branch, air from the fresh air intake arrangement, injecting fuel into the second cylinder so as to provide repetitive combustions with air, expelling from the second cylinder, to the second exhaust guide, exhaust gases produced by the combustions in the second cylinder, and guiding at least a portion of the exhaust gases through the second exhaust guide, and to the exhaust after treatment system.

It should be noted that in some embodiments, all exhaust gases may be guided through the second exhaust guide, and to the exhaust after treatment system. In other embodiments, some of the exhaust gases may be recirculated from the second exhaust guide to the second intake guide branch by means of the second EGR passage branch.

The objects are also reached with a computer program according to claim 17, a computer readable medium according to claim 18, a control unit according to claim 19, an internal combustion engine according to claim 20, or a vehicle according to claim 21.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
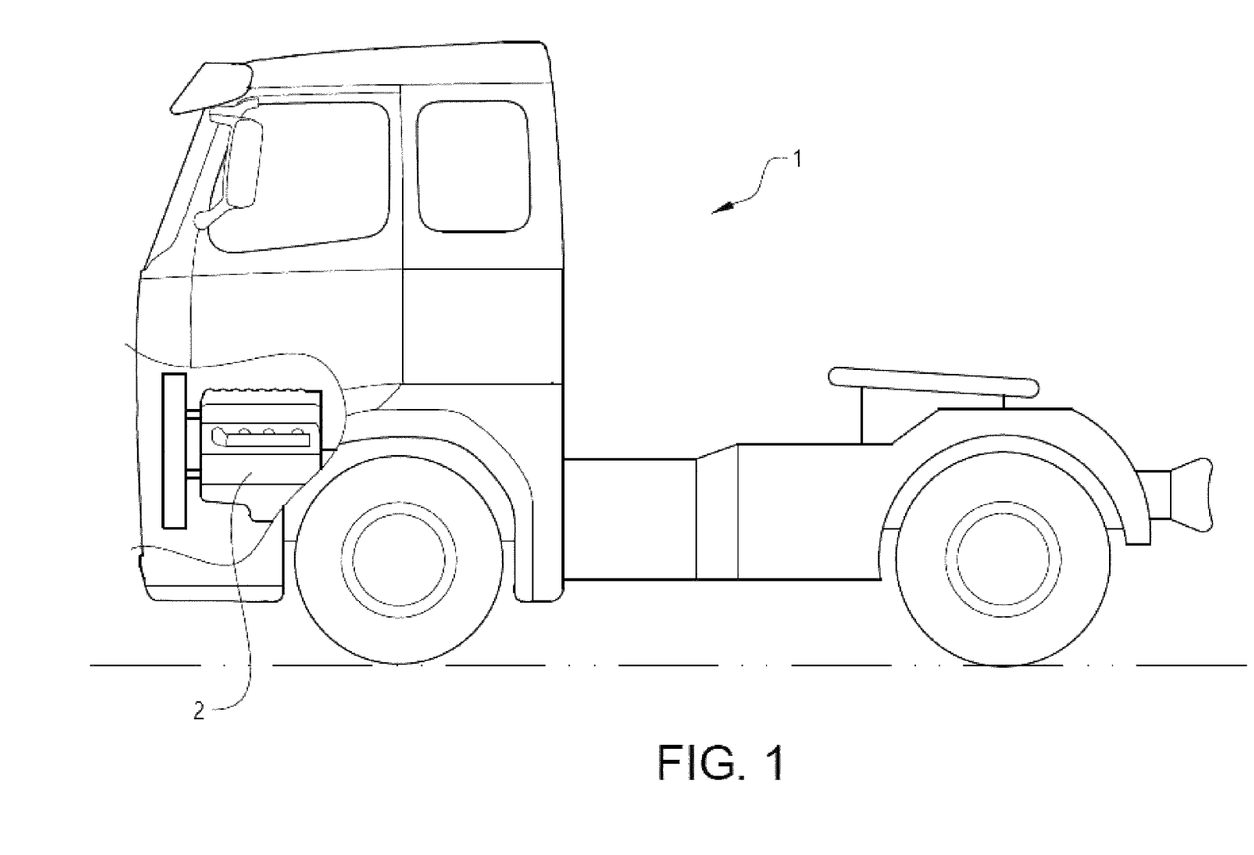
FIG. 1 is a side view of a truck comprising an internal combustion engine and an exhaust after treatment system.

FIG. 1 shows a vehicle 1 in the form of a truck in a partly cut side view. The vehicle 1 has an internal combustion engine 2 for the propulsion of the vehicle 1.

Figure 2:
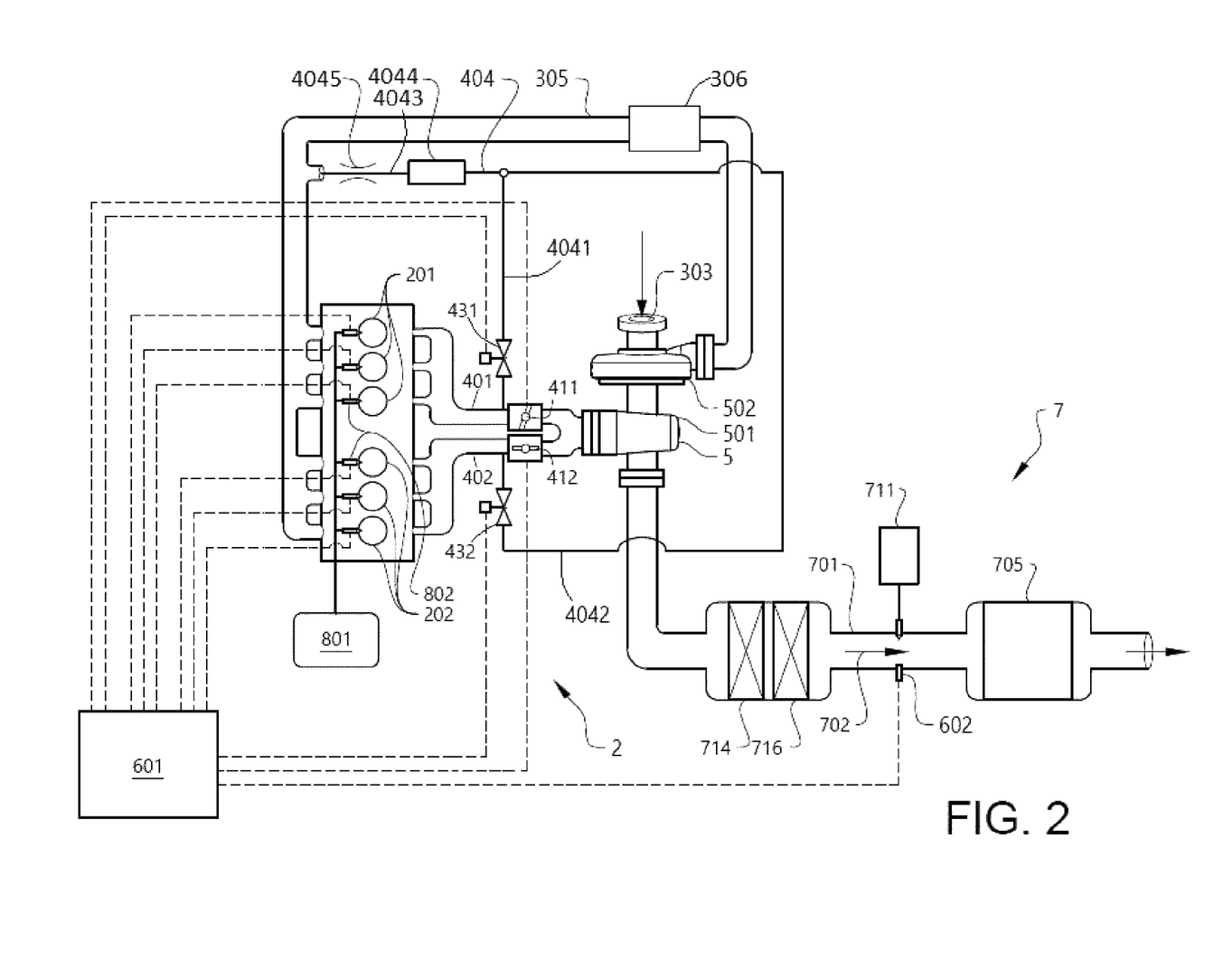
FIG. 2 is a diagram of the engine and the exhaust aftertreatment system in the vehicle in FIG. 1.

As depicted in FIG. 2, the engine 2 comprises a plurality of cylinders, in this example six cylinders in an inline configuration. The cylinders are divided into a first cylinder group and a second cylinder group. The cylinders in the first cylinder group are herein referred to as first cylinders 201. The cylinders in the second cylinder group are herein referred to as second cylinders 202. In this example there are three first cylinders and three second cylinders. It should be noted that the invention is equally applicable to engines with a different number of cylinders, e.g. two, three, seven, etc. Also, the number of cylinders in the first and second cylinder groups may be mutually different. In addition, the cylinder may have a configuration which different from an inline configuration, e.g. a V-configuration.

A control unit 601 is arranged to control devices in the engine 2 as described below.

The engine comprises a fuel system 801 arranged to inject fuel into the first and second cylinders 201, 202 by means of fuel injectors 802, each arranged to inject fuel directly into a respective of the cylinders 201, 202. The fuel injectors 802 are individually controllable by the control unit 601.

The cylinders 201, 202 are provided with pistons arranged to reciprocate in the cylinders. Each of the first and second cylinders 201, 202 is arranged to receive air from a fresh air intake arrangement 303. Thus, the cylinders are arranged to receive fuel, and to provide repetitive combustions by means of the received air and fuel. In this example, the engine is a diesel engine in which air received in the cylinders is compressed and fuel is injected into the compressed air.

The first and second cylinders 201, 202 are arranged to receive the air from the fresh air intake arrangement 303 via an intake guide 305. The intake guide 305 forms an air intake manifold. The intake guide 305 is arranged to guide air to the first and second cylinders 201, 202, respectively, from the fresh air intake arrangement 303.

The engine 1 further comprises a first exhaust guide 401 and a second exhaust guide 402 arranged to guide gases from the first cylinders 201 and the second cylinders 202, respectively, towards an exhaust after treatment system (EATS) 7 described below. A first exhaust valve 411 is provided in the first exhaust guide 401 and arranged to selectively reduce or inhibit a gas flow through the first exhaust guide 401 towards the EATS 7. A second exhaust valve 412 is provided in the second exhaust guide 402 and arranged to selectively reduce or inhibit a gas flow through the second exhaust guide 402 towards the EATS 7. The first and second exhaust valves 411, 412 are controllable by the control unit 601.

An exhaust gas recirculating (EGR) passage 404 is provided for recirculating gases from the first and second exhaust guides 401, 402 to the first and second cylinder 201, 202. The EGR passage 404 joins the intake guide 305 between the cylinders and an intercooler 306 provided along the intake guide 305. The EGR passage 404 presents two branches 4041, 4042, herein referred to as first and second EGR passage branches, each extending from one of the first and second exhaust guides 401, 402 to a common EGR passage portion 4043. The first and second EGR passage branches 4041, 4042 extend from a respective of the first and second exhaust guides 401, 402, upstream of the first and second exhaust valves 411, 412. A first and a second EGR valve 431, 432 are arranged to control the flow through a respective of said EGR passage branches. The first and a second EGR valves 431, 432 are controllable by the control unit 601.

An EGR cooler 4044 is arranged to cool gases guided in the EGR passage 404. A part of the EGR passage 404 is provided in the form of a venturi tube 4045. The venturi tube 4045 may be provided with a pressure difference sensor, which may be used for determining the EGR flow.

A turbo charger 5 comprises a turbine 501 which is located downstream of the exhaust valves 411, 412, and is arranged to receive gases from the first and second exhaust guides 401, 402. The turbine is arranged to drive a compressor 502 which is provided upstream of the intake guide 305 and downstream of the fresh air intake arrangement 303. As stated, the intercooler 306 is arranged along the intake guide 305.

The vehicle 1 also comprises an exhaust after treatment system 7 for treating exhaust gases from the engine 2. The exhaust after treatment system 7 comprises an exhaust conduit 701 for conveying exhaust gases discharged from the engine 2, as indicated by the arrow 702. The exhaust after treatment system 7 further comprises a selective catalytic reduction (SCR) catalyst 705 provided in the exhaust conduit 701 for selectively reducing NOx contained in the exhaust gas. The exhaust after treatment system 7 further comprises means 711 for supplying a reductant, e.g. urea or ammonia, into the exhaust conduit 701 upstream of the SCR catalyst 705, for the NOx reduction process in the SCR catalyst. The exhaust after treatment system 7 also comprises upstream of the SCR catalyst 705 and upstream of the reductant supply means 711 an oxidation catalyst (DOC) 714 having the function of oxidizing carbon monoxide (CO), hydrocarbons (HC) and nitrogen monoxide (NO) contained in the exhaust gases. The exhaust after treatment system 7 further comprises a diesel particulate filter (DPF) 716 disposed downstream of the DOC 714 and upstream of the injector 713 for capturing and collecting particulate matter contained in exhaust gas.

Figure 3:
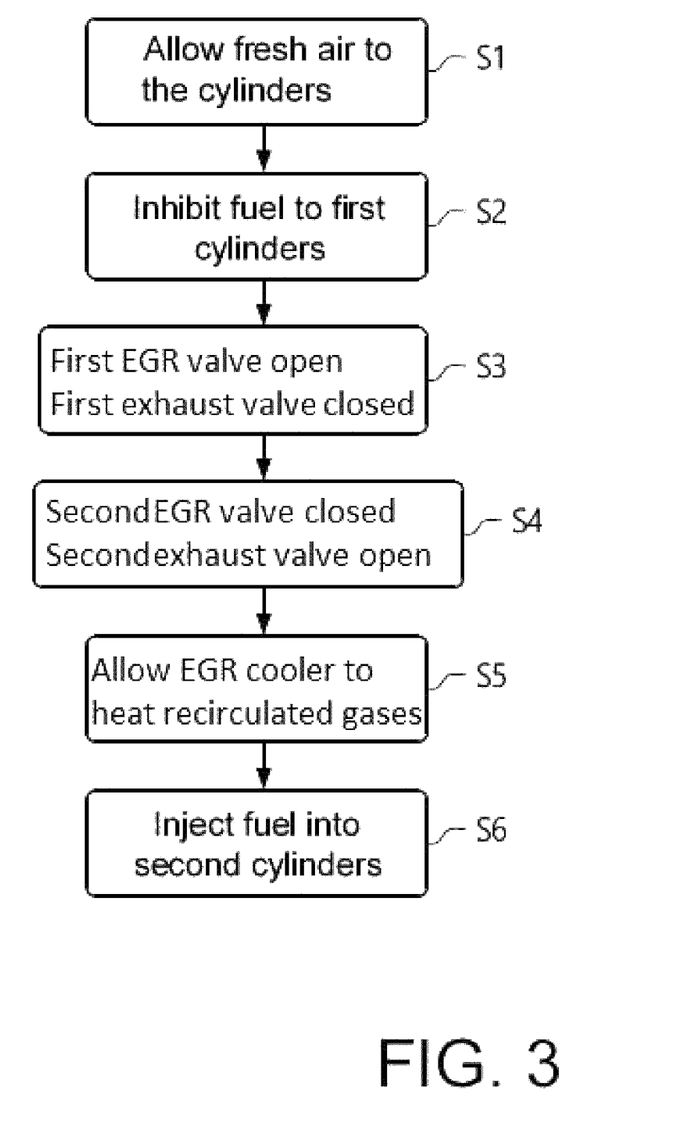
FIG. 3 shows a block diagram depicting steps in a method according to an embodiment of the invention to control the engine in FIG. 2.

The control unit 601 is arranged to determine the exhaust gas temperature by means of a temperature sensor 602 arranged to detect the temperature in the exhaust conduit 701. Reference is made to FIG. 3 depicting steps in a method according to an embodiment of the invention to control the engine 2.

When conditions are such that the temperature of the exhaust gases from the engine are not high enough for the EATS to work efficiently, e.g. during a cold start event, or extended idling or low load situations, the engine is controlled as follows:

Air from the fresh air intake arrangement 303 is allowed 51 to the first and second cylinders 201, 202. The fuel system 801 is controlled so that no fuel is injected S2 by the fuel injectors for the first cylinders 201. Thereby, all air received in the first cylinders 201 will be expelled from the first cylinders into the first exhaust guide 401.

The first EGR valve 431 is controlled to be open and the first exhaust valve 411 is controlled S4 to be closed S3. The second EGR valve 432 is controlled to be closed and the second exhaust valve 412 is controlled to be open S4. Thereby, the transport of gases from the first cylinder 201 to the EATS 7 is inhibited and all gases expelled from the first cylinder 201 are guided to the intake guide 305 via the first EGR passage branch 4041, and the common EGR passage portion 4043. In the intake guide 305, gases expelled from the first cylinder 201 are mixed with air from the fresh air intake arrangement 303.

It should be noted that the EGR cooler 4044 may provide heat S5 to the gases recirculated from the first cylinders via the first EGR passage branch 4041, and the common EGR passage portion 4043.

It should be noted that it is alternatively possible to throttle the first exhaust guide flow through the first exhaust valve 411 so that only a portion of the gases from the first cylinders 201 are guided through the first EGR passage branch 4041.

Simultaneously, the fuel system 801 is controlled S6 so as to inject fuel into the second cylinders 202, so as to provide repetitive combustions with air in the gases guided to the second cylinders 202 from the fresh air intake arrangement 303 and the first cylinders 201. The air introduced to the second cylinders may have a temperature which is a mean value of the temperature of the air expelled by intercooler 306 and the temperature of the air expelled by the EGR cooler 4044. Since the is no combustion in the first cylinders, twice so much fuel may be injected per second cylinder, compared to a traditional operation with combustions in all cylinders. This increased fuel injection may result in a temperature increase that is approximately twice as high as in a traditional operation with combustions in all cylinders. Since half of the intake flow is conditioned by EGR cooler the increased intake temperature is higher than in traditional EGR engines, causing an increase in temperature.

Exhaust gases from the second cylinders 202, provided with a high temperature due to said recirculation, are guided to the EATS via the second exhaust guide 402 and the turbine 501.

It should be noted that some of the air recirculated from the first cylinders to the intake guide 305 are reintroduced to the first cylinders. It is understood that some of the air recirculated from the first cylinders is also introduced to the second cylinders.

Figure 4:
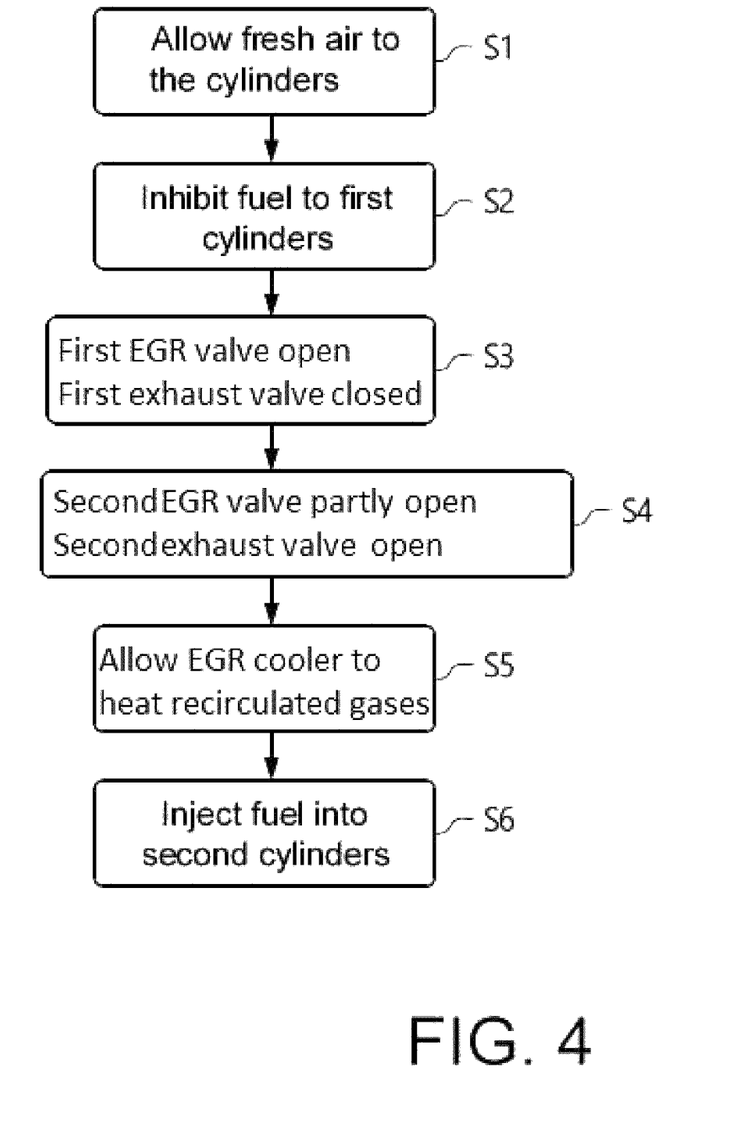
FIG. 4 shows a block diagram depicting steps in a method according to another embodiment of the invention.

Reference is made to FIG. 4. In an alternative embodiment, the settings of the first EGR valve 431, the first exhaust valve 411, and the second exhaust valve 412 are the same as in the embodiment described with reference to FIG. 2 and FIG. 3. Thus, the first EGR valve 431 is controlled to be open, the first exhaust valve 411 is controlled to be closed, and the second exhaust valve 412 is controlled to be open. However, the second EGR valve 432 is controlled to be partly open S4. Thereby, a part of the exhaust gases from the second cylinders are mixed with the gases from the first cylinders. The mixed gases are guided through the EGR cooler. The flow of recirculated exhaust gases from the second cylinder is controlled by controlling the position of the second EGR valve 432. The flow of recirculated exhaust gases from the second cylinder is also determined by the pressure difference between the second exhaust guide 402 and the EGR cooler 4044. This pressure difference can be increased by increasing the pressure in the second exhaust guide 402, by partly closing S4 the second exhaust valve 412. Another way of increasing the pressure difference between the second exhaust guide 402 and the EGR cooler 4044 is by reducing the pressure in the intake guide 305 by controlling a throttle therein (not shown).

Figure 5:
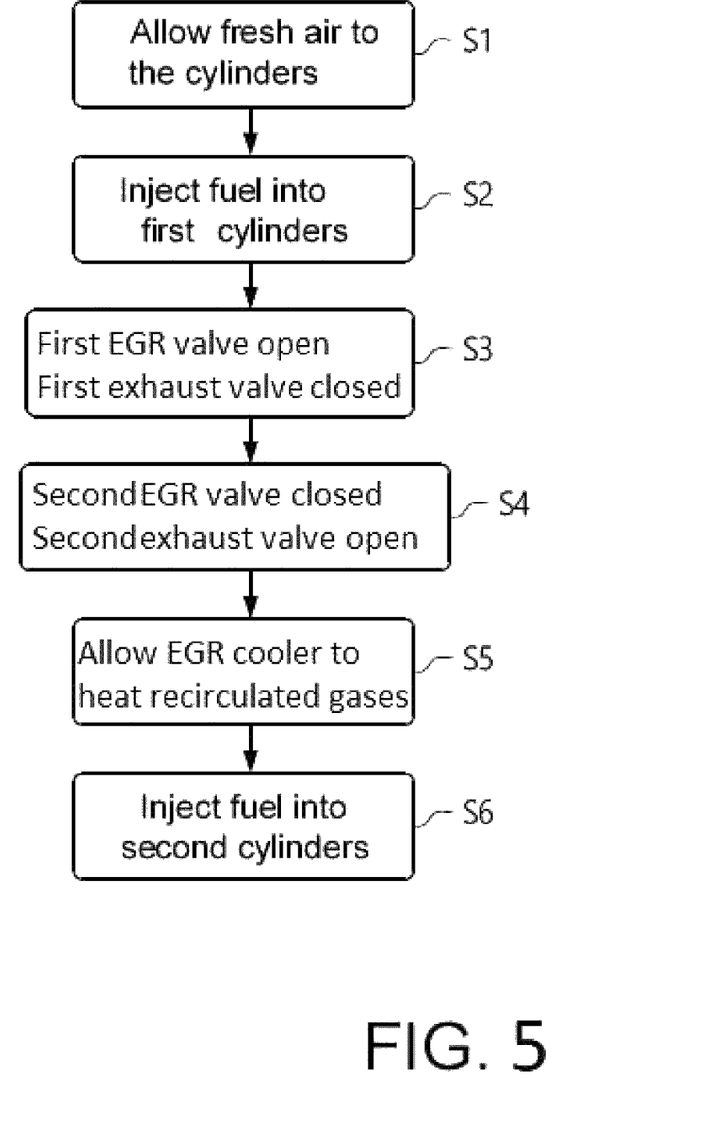
FIG. 5 shows a block diagram depicting steps in a method according to a further embodiment of the invention.

Reference is made to FIG. 5. In a further embodiment, the steps are the same as the ones in the embodiment described with reference to FIG. 3, except for the following. Instead of inhibiting combustion in the first cylinders 201, fuel is injected S6 into the first cylinders 201 to allow combustions therein. This is beneficial at slightly higher loads. The amount of vibrations may be reduced by the combustions in the first cylinders. Since the gases from the first cylinders are mixed in the intake guide 305 with fresh air and thereby cooled, a reduced production of nitride oxides (NOx) will be provided. Therefore, in such an embodiment, recirculation of gases from the second cylinders may not be not needed.

The amount of fuel to be injected into the first cylinders 201 may be determined based on the air mass flow from the air intake arrangement 303 and a desired EGR ratio, i.e. a ratio of air and combustion products, in the gases expelled from the first cylinders 201 and guided to the intake guide. The air mass flow may be determined based on the pressure in the intake guide 305, e.g. determined by means of a pressure sensor (not shown) in the intake guide 305, based on the temperature in the intake guide 305, e.g. determined by means of a temperature sensor (not shown) in the intake guide 305, and based on the volumetric efficiency of the engine. The fuel system 801 is controlled to inject S6 fuel according to the determined fuel amount into the first cylinders 201 so as to provide repetitive combustions with the air received in the first cylinders 201.

Thus, the method described with reference to FIG. 5 comprises controlling, by continuously or repeatedly adjusting the amount of fuel injected into the first cylinders 201, the EGR ratio by controlling the ratio of air and combustion products, in the gases expelled from the first cylinders 201 and guided to the second cylinders 202.

In this example combustions in the first cylinder are compression ignited in a diesel cycle manner. The amount of fuel injected for each combustion in the first cylinders 201 may be smaller than the amount of fuel injected for each combustion in the second cylinders 202. It is understood that the gases expelled from the first cylinders 201 comprise some combustion products as well as air not consumed by the combustions in the first cylinders.

It should be noted that some of the gases recirculated from the first cylinders to the intake guide 305 are reintroduced to the first cylinders.

Embodiments of the invention may comprise continuously or repeatedly determining a load of the engine 2. This may be done as is known per se, e.g. based on the air mass flow from the air intake arrangement 303, the amount of fuel injected into the cylinders 201, 202 and the rotational speed of the engine. Based on the determined load, it may be determined to allow the engine to operate in a normal mode with all cylinders participating equally in the crankshaft torque production.

Figure 6:
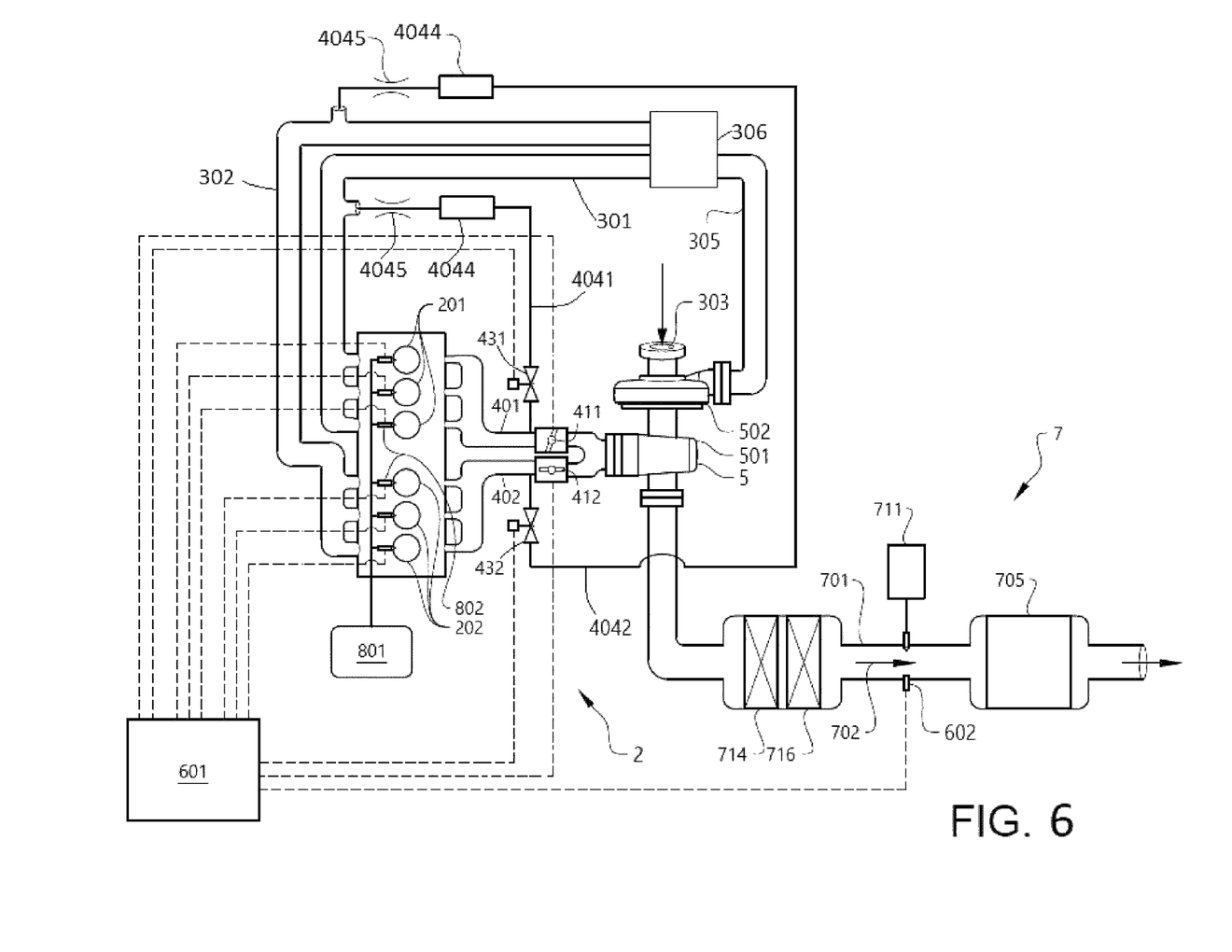
FIG. 6 is a diagram of an engine and an exhaust aftertreatment system according to an alternative embodiment of the invention.

FIG. 6 shows an engine and an exhaust aftertreatment system according to an alternative embodiment. Differing from the embodiment described with reference to FIG. 2, the intake guide comprises first and second intake guide branches 301, 302. Thereby, the first and second cylinders 201, 202 are arranged to receive the air from the fresh air intake arrangement 303 via the first and second intake guides branches 301, 302, respectively. The first intake guide branch 301 and the second intake guide branch 302 are arranged to guide air to the first and second cylinders 201, 202, respectively, from the intercooler 306.

A first EGR passage branch 4041 extends from the first exhaust guide 401 to the first intake guide branch 301. A second EGR passage branch 4042 extends from the second exhaust guide 402 to the second intake guide branch 302. The first and second EGR passage branches 4041, 4042 extend from a respective of the first and second exhaust guides 401, 402, upstream of the first and second exhaust valves 411, 412. A first and a second EGR valve 431, 432 are arranged to individually control the flow through a respective of said EGR passage branches.

In each of the first and second EGR passage branches 4041, 4042 an EGR cooler 4044 is arranged to cool gases guided in the respective first and second EGR passage branches 4041, 4042.

When conditions are such that the temperature of the exhaust gases from the engine are not high enough for the EATS to work efficiently, e.g. during a cold start event, or extended idling or low load situations, the engine in FIG. 6 is controlled as follows:

Air from the fresh air intake arrangement 303 is allowed to the first and second cylinders 201, 202. The fuel system 801 is controlled so that no fuel is injected by the fuel injectors for the first cylinders 201. Thereby, all air received in the first cylinders 201 will be expelled from the first cylinders into the first exhaust guide 401.

The first EGR valve 431 is controlled to be open and the first exhaust valve 411 is controlled to be closed. The second EGR valve 432 is controlled to be closed and the second exhaust valve 412 is controlled to be open. Thereby, the transport of air from the first cylinder 201 to the EATS 7 is inhibited and all air expelled from the first cylinder 201 is guided to the first intake guide branch 301 via the first EGR passage branch 4041. Thereby, the recirculated air will be reintroduced to the first cylinders 201.

Simultaneously, the fuel system 801 is controlled so as to inject fuel into the second cylinders 202, so as to provide repetitive combustions with air in the gases guided to the second cylinders 202 from the fresh air intake arrangement 303. Exhaust gases from the second cylinders 202 are guided to the EATS via the second exhaust guide 402 and the turbine 501.

Thereby, from the intercooler 306 to the turbine 501 the gases are strictly separated between two banks, each including the first and second cylinders respectively. The bank with the first cylinders will recirculate fresh air.

It is to be understood that the present invention is not limited to the embodiments described above and illustrated in the drawings; rather, the skilled person will recognize that many changes and modifications may be made within the scope of the appended claims.

The invention claimed is:

1. A method for controlling an internal combustion engine comprising at least one first cylinder and at least one second cylinder with respective reciprocating pistons, an intake guide arranged to guide air from a fresh air intake arrangement to the first and second cylinders, a fuel system arranged to inject fuel into the first and second cylinders, a first exhaust guide and a second exhaust guide arranged to guide gases from the first and second cylinders, respectively, towards an exhaust after treatment system, the method comprising receiving in the first cylinder, from the intake guide, air from the fresh air intake arrangement, or gases including air from the fresh air intake arrangement, and expelling from the first cylinder, to the first exhaust guide, gases in the form of the air received in the first cylinder, or in the form of exhaust gases from combustions in the first cylinder, including a portion of the air received in the first cylinder, controlling a first exhaust valve located in the first exhaust guide so as to reduce or inhibit the transport of the gases from the first cylinder to the exhaust after treatment system, and simultaneously recirculating the gases from the first exhaust guide to the intake guide by means of an exhaust gas recirculating (EGR) passage, receiving in the second cylinder, from the intake guide, at least a portion of the gases recirculated from the first exhaust guide to the intake guide, injecting fuel into the second cylinder so as to provide repetitive combustions with air the received gases, expelling from the second cylinder, to the second exhaust guide, exhaust gases produced by the combustions in the second cylinder, and controlling a second exhaust valve located in the second exhaust guide so as to guide at least a portion of the exhaust gases expelled from the second cylinder through the second exhaust guide, and to the exhaust after treatment system, wherein the EGR passage comprises a first EGR passage branch, extending from the first exhaust guide and being arranged to communicate with the intake guide, and a second EGR passage branch, extending from the second exhaust guide and being arranged to communicate with the intake guide, a first and a second EGR valve being separate valves from the first and second exhaust valves and being arranged to control the flow through the first and second EGR passage branches, respectively, wherein the first and second EGR passage branches extend from a respective of the first and second exhaust guides, upstream of the first and second exhaust valves, wherein a turbine of a turbo charger of the engine is located downstream of the first and second exhaust valves.

2. A method according to claim 1, further comprising controlling the first exhaust valve so as to inhibit the transport of the gases from the first cylinder to the exhaust after treatment system, and recirculating all gases from the first cylinder to the intake guide by means of the EGR passage.

3. A method according to claim 1, further comprising controlling the fuel system so as to inhibit injection of fuel into the air or gases received in the first cylinder.

4. A method according to claim 1, wherein an EGR cooler is arranged to exchange heat with the gases guided in the EGR passage.

5. A method according to claim 1, wherein recirculating the gases from the first exhaust guide to the intake guide comprises controlling the first EGR valve so as to be open.

6. A method according to claim 5, wherein recirculating the gases from the first exhaust guide to the intake guide comprises controlling the second EGR valve to be closed.

7. A method according to claim 5, further comprising controlling, simultaneously to controlling the first EGR valve so as to be open, the second EGR valve to be at least partly open.

8. A method according to claim 5, further comprising controlling, simultaneously to controlling the first EGR valve so as to be open, the position of the second EGR valve to control the flow of recirculated exhaust gases from the second cylinder.

9. A method according to claim 5, further comprising partly closing the second exhaust valve, simultaneously to controlling the first EGR valve so as to be open.

10. A method according to claim 1, further comprising controlling the fuel system to inject fuel into the first cylinder so as to provide repetitive combustions with the air or gases received in the first cylinder.

11. A method according to claim 10, wherein the amount of fuel injected for each combustion in the first cylinder is smaller than the amount of fuel injected for each combustion in the second cylinder.

12. A method according to claim 1, further comprising controlling a ratio of air in the gases expelled from the first cylinder and guided to the intake guide by controlling the amount of fuel injected into the first cylinder.

13. An internal combustion engine comprising at least one first cylinder and at least one second cylinder with respective reciprocating pistons, an intake guide arranged to guide air from a fresh air intake arrangement to the first and second cylinders, a fuel system arranged to inject fuel into the first and second cylinders, a first exhaust guide and a second exhaust guide arranged to separately guide gases from the first and second cylinders, respectively, towards an exhaust after treatment system, a first exhaust valve located in the first exhaust guide so as to reduce or inhibit the transport of gases from the first cylinder to the exhaust after treatment system, a second exhaust valve located in the second exhaust guide, so as to reduce or inhibit the transport of gases from the second cylinder to the exhaust after treatment system, the first and second exhaust valves being individually controllable, a first EGR passage branch extending from the first exhaust guide and being arranged to communicate with the intake guide, a second EGR passage branch extending from the second exhaust guide and being arranged to communicate with the intake guide, a first and a second EGR valve being separate valves from the first and second exhaust valves and being arranged to control the flow through the first and second EGR passage branches, respectively, wherein the first and second EGR valves are individually controllable, wherein the first and second EGR passage branches extend from a respective of the first and second exhaust guides, upstream of the first and second exhaust valves, wherein a turbine of a turbo charger of the engine is located downstream of the first and second exhaust valves.

14. An engine according to claim 13, wherein the first and second EGR passage branches both communicate with the first and second cylinders via the intake guide.

15. An engine according to claim 13, wherein the intake guide comprises a first and a second intake guide branch, whereby each of the first and second cylinders is arranged to receive air from the fresh air intake arrangement separately via first and second intake guide branches, respectively, the first EGR passage branch extending to the first intake guide branch, and the second EGR passage branch extending to the second intake guide branch.

16. A method for controlling an internal combustion engine comprising at least one first cylinder and at least one second cylinder with respective reciprocating pistons, an intake guide: arranged to guide air from a fresh air intake arrangement to the first and second cylinders, a fuel system arranged to inject fuel into the first and second cylinders, a first exhaust guide and a second exhaust guide arranged to separately guide gases from the first and second cylinders, respectively, towards an exhaust after treatment system, a first exhaust valve located in the first exhaust guide so as to reduce or inhibit the transport of gases from the first cylinder to the exhaust after treatment system, a second exhaust valve located in the second exhaust guide, so as to reduce or inhibit the transport of gases from the second cylinder to the exhaust after treatment system, the first and second exhaust valves being individually controllable, a first EGR passage branch extending from the first exhaust guide and being arranged to communicate with the intake guide, a second EGR passage branch extending from the second exhaust guide and being arranged to communicate with the intake guide, a first and a second EGR valve being separate valves from the first and second exhaust valves and being arranged to control the flow through the first and second EGR passage branches, respectively, wherein the first and second EGR valves are individually controllable, wherein the intake guide comprises a first and a second intake guide branch, whereby each of the first and second cylinders is arranged to receive air from the fresh air intake arrangement separately via first and second intake guide branches, respectively, the first EGR passage branch extending to the first intake guide branch, and the second EGR passage branch extending to the second intake guide branch, the method comprising receiving in the first cylinder, from the first intake guide branch, air from the fresh air intake arrangement, controlling the fuel system so as to inhibit injection of fuel into the air received in the first cylinder, expelling from the first cylinder, to the first exhaust guide, the air received in the first cylinder, controlling the first exhaust valve so as to reduce or inhibit the transport of the air from the first cylinder to the exhaust after treatment system and simultaneously recirculating the air from the first exhaust guide to the first intake guide branch by means of the first EGR passage branch, receiving in the second cylinder, from the second intake guide branch, air from the fresh air intake arrangement, injecting fuel into the second cylinder so as to provide repetitive combustions with air, expelling from the second cylinder, to the second exhaust guide, exhaust gases produced by the combustions in the second cylinder, and guiding at least a portion of the exhaust gases through the second exhaust guide, and to the exhaust after treatment system.

17. A computer program comprising program code means for performing the steps of claim 1 when said program is run on a computer.

18. A computer readable medium carrying a computer program comprising program code means for performing the steps of claim 1 when said program product is run on a computer.

19. A control unit configured to perform the steps of the method according to claim 1.

20. An internal combustion engine comprising a control unit according to claim 19.

21. A vehicle comprising an engine according to claim 13.

* * * * *